United States Patent
Fujita

(10) Patent No.: US 10,645,308 B2
(45) Date of Patent: May 5, 2020

(54) PROJECTION DISPLAY DEVICE, PROJECTION DISPLAY METHOD, AND PROJECTION DISPLAY PROGRAM

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 16/048,375

(22) Filed: Jul. 30, 2018

(65) Prior Publication Data

US 2018/0338094 A1 Nov. 22, 2018

Related U.S. Application Data

(63) Continuation of application No. PCT/JP2017/000767, filed on Jan. 12, 2017.

(30) Foreign Application Priority Data

Feb. 22, 2016 (JP) .................. 2016-030907

(51) Int. Cl.
*H04N 5/272* (2006.01)
*B60R 1/00* (2006.01)
(Continued)

(52) U.S. Cl.
CPC .............. *H04N 5/272* (2013.01); *B60R 1/00* (2013.01); *B60R 1/002* (2013.01);
(Continued)

(58) Field of Classification Search
CPC combination set(s) only.
See application file for complete search history.

(56) References Cited

U.S. PATENT DOCUMENTS 7,640,107 B2 * 12/2009 Shimizu .................. B60K 35/00
701/523
9,016,872 B2 * 4/2015 Aruga .................. G03B 21/147
348/586
(Continued)

FOREIGN PATENT DOCUMENTS

JP 2006510543 3/2006
JP 2006248374 9/2006
(Continued)

OTHER PUBLICATIONS

"International Search Report (Form PCT/ISA/210) of PCT/JP2017/000767", dated Mar. 28, 2017, with English translation thereof, pp. 1-5.
(Continued)

*Primary Examiner* — Janese Duley
(74) *Attorney, Agent, or Firm* — JCIPRNET

(57) ABSTRACT

The projection display device includes a captured image data acquisition unit 61 that acquires captured image data obtained through image capturing performed by an imaging unit that captures an image of a region around a vehicle; a contour image data generation unit 62 that generates, in accordance with the captured image data, contour image data representing contours in a captured image that is based on the captured image data; and a projection display unit that performs, in accordance with image data including the contour image data, spatial modulation on light emitted by a light source (41r, 41g, 41b), and projects image light obtained through the spatial modulation onto a front windshield 1 in the vehicle.

20 Claims, 10 Drawing Sheets

(51) Int. Cl.
*H04N 7/18* (2006.01)
*G06K 9/00* (2006.01)
*G02B 27/01* (2006.01)

(52) U.S. Cl.
CPC ..... *G02B 27/0101* (2013.01); *G06K 9/00798* (2013.01); *G06K 9/00805* (2013.01); *G06K 9/00812* (2013.01); *H04N 7/18* (2013.01); *H04N 7/183* (2013.01); *B60R 2300/205* (2013.01); *B60R 2300/207* (2013.01); *B60R 2300/30* (2013.01); *B60R 2300/305* (2013.01); *B60R 2300/8093* (2013.01)

(56) References Cited

U.S. PATENT DOCUMENTS

| | | | | |
|---|---|---|---|---|
| 2003/0074119 | A1* | 4/2003 | Arlinsky | B60K 35/00 |
| | | | | 701/36 |
| 2006/0152384 | A1 | 7/2006 | Eggers et al. | |
| 2012/0206249 | A1* | 8/2012 | Lee | H05B 45/00 |
| | | | | 340/432 |
| 2012/0249399 | A1 | 10/2012 | Sato | |
| 2016/0231827 | A1* | 8/2016 | Kramer | H04M 1/6091 |

FOREIGN PATENT DOCUMENTS

| | | |
|---|---|---|
| JP | 2008308063 | 12/2008 |
| JP | 2010257282 | 11/2010 |
| JP | 2012212338 | 11/2012 |
| JP | 2013212723 | 10/2013 |

OTHER PUBLICATIONS

"Written Opinion (Form PCT/ISA/237)", dated Mar. 28, 2017, with English translation thereof, pp. 1-10.

* cited by examiner

PROJECTION DISPLAY DEVICE, PROJECTION DISPLAY METHOD, AND PROJECTION DISPLAY PROGRAM

CROSS-REFERENCE TO RELATED APPLICATIONS

This application is a Continuation of PCT International Application No. PCT/JP2017/000767 filed on Jan. 12, 2017, which claims priority under 35 U.S.C. § 119(a) to Japanese Patent Application No. 2016-030907 filed on Feb. 22, 2016. Each of the above application(s) is hereby expressly incorporated by reference, in its entirety, into the present application.

BACKGROUND OF THE INVENTION

1. Field of the Invention

The present invention relates to a projection display device, a projection display method, and a non-transitory recording medium readable by a computer for recording a projection display program.

2. Description of the Related Art

A head-up display (HUD) for a vehicle has been known. In the HUD, a combiner disposed on a windshield or near the windshield is used as a screen and light is projected onto the screen to display an image in a vehicle, such as an automobile, a train, a ship, a heavy machine, an aircraft, or an agricultural machine. The HUD enables a driver to visually recognize an image that is based on light projected from the HUD as a real image on the screen or as a virtual image in front of the screen.

JP2013-212723A describes a device that assists parking of an automobile by using the HUD. In the parking assist device described in JP2013-212723A, when a shift lever of an automobile is moved to the "reverse" position, an image captured by an imaging unit installed at a back portion of the automobile is displayed on the HUD.

JP2006-248374A describes a vehicle safety confirmation device that realizes a safe and easy lane change by displaying, on a HUD, images captured by an imaging unit that captures an image of a region to the left of an automobile, an imaging unit that captures an image of a region to the right of the automobile, and an imaging unit that captures an image of a region behind the automobile.

SUMMARY OF THE INVENTION

As in JP2013-212723A, with a captured image obtained by capturing an image of a view behind the automobile being displayed on the HUD at the time of parking the automobile, the driver is able to perform a parking operation while looking ahead without moving his/her line of sight. However, during the parking operation, a back-and-forth movement of the automobile may be performed, and there is a possibility that switching between moving forward and backward is frequently performed.

For example, a state is assumed in which the driver is reversing the automobile while checking a captured image of a region behind the automobile displayed on the HUD. In this state, there is a possibility that the driver does not notice an obstacle in front of the automobile due to the captured image displayed on the HUD. If the driver sets the automobile to a forward mode and moves the automobile forward to perform a back-and-forth movement from this state, display of the HUD is turned off. At this time, if an obstacle is present in a region in which the captured image is displayed on the HUD, there is a possibility that the driver is unable to recognize the obstacle.

In addition, as in JP2006-248374A, in a configuration in which images captured by the imaging units are displayed on the HUD in a state in which the automobile is moving forward, a field of front vision is obstructed by the captured images displayed on the HUD. Accordingly, there is a possibility that the driver is unable to recognize an obstacle or a while line or the like in front of the automobile.

In addition to the cases described in JP2013-212723A and JP2006-248374A, a case is assumed in which a captured image obtained by capturing an image of a region around a vehicle is displayed on a HUD in a state in which the vehicle is moving forward. Also in this case, there is a possibility that a field of vision in front of the vehicle is obstructed.

The present invention has been made in view of the above-described circumstances and an object of the present invention is to provide a projection display device, a projection display method, and a non-transitory recording medium readable by a computer for recording a projection display program that are able to provide a driver with useful information while ensuring a sufficient field of vision in a moving direction during a forward movement.

A projection display device according to the present invention includes a captured image data acquisition unit that acquires captured image data obtained through image capturing performed by an imaging unit that captures an image of a region around a vehicle; a contour image data generation unit that generates, in accordance with the captured image data, contour image data representing contours in a captured image that is based on the captured image data; and a projection display unit that performs, in accordance with image data including the contour image data, spatial modulation on light emitted by a light source, and projects image light obtained through the spatial modulation onto a projection surface in the vehicle.

A projection display method according to the present invention includes a captured image data acquisition step of acquiring captured image data obtained through image capturing performed by an imaging unit that captures an image of a region around a vehicle; a contour image data generation step of generating, in accordance with the captured image data, contour image data representing contours in a captured image that is based on the captured image data; and a projection display step of performing, in accordance with data including the contour image data, spatial modulation on light emitted by a light source, and projecting image light obtained through the spatial modulation onto a projection surface in the vehicle.

A non-transitory recording medium readable by a computer for recording a projection display program according to the present invention is a program for causing a computer to execute a captured image data acquisition step of acquiring captured image data obtained through image capturing performed by an imaging unit that captures an image of a region around a vehicle; a contour image data generation step of generating, in accordance with the captured image data, contour image data representing contours in a captured image that is based on the captured image data; and a projection display step of performing, in accordance with data including the contour image data, spatial modulation on light emitted by a light source, and projecting image light obtained through the spatial modulation onto a projection surface in the vehicle.

According to the present invention, a projection display device, a projection display method, and a non-transitory recording medium readable by a computer for recording a projection display program that are able to provide a driver with useful information while ensuring a sufficient field of vision in a moving direction during a forward movement can be provided.

DESCRIPTION OF THE PREFERRED EMBODIMENTS

Hereinafter, an embodiment of the present invention will be described with reference to the drawings.

Figure 1:
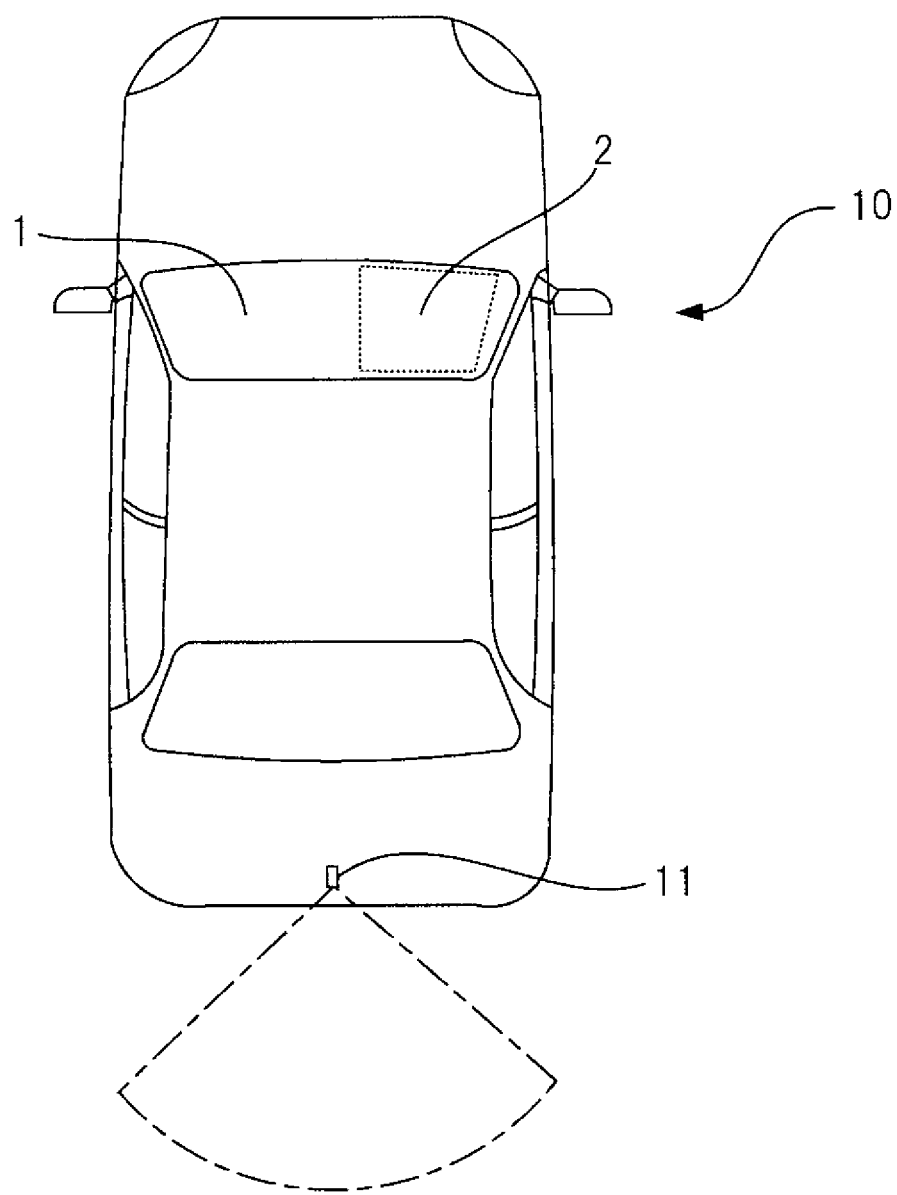
FIG. 1 is a schematic diagram illustrating a schematic configuration of an automobile 10 in which a head-up display (HUD) 100, which is an embodiment of a projection display device of the present invention, is mounted.
Figure 2:
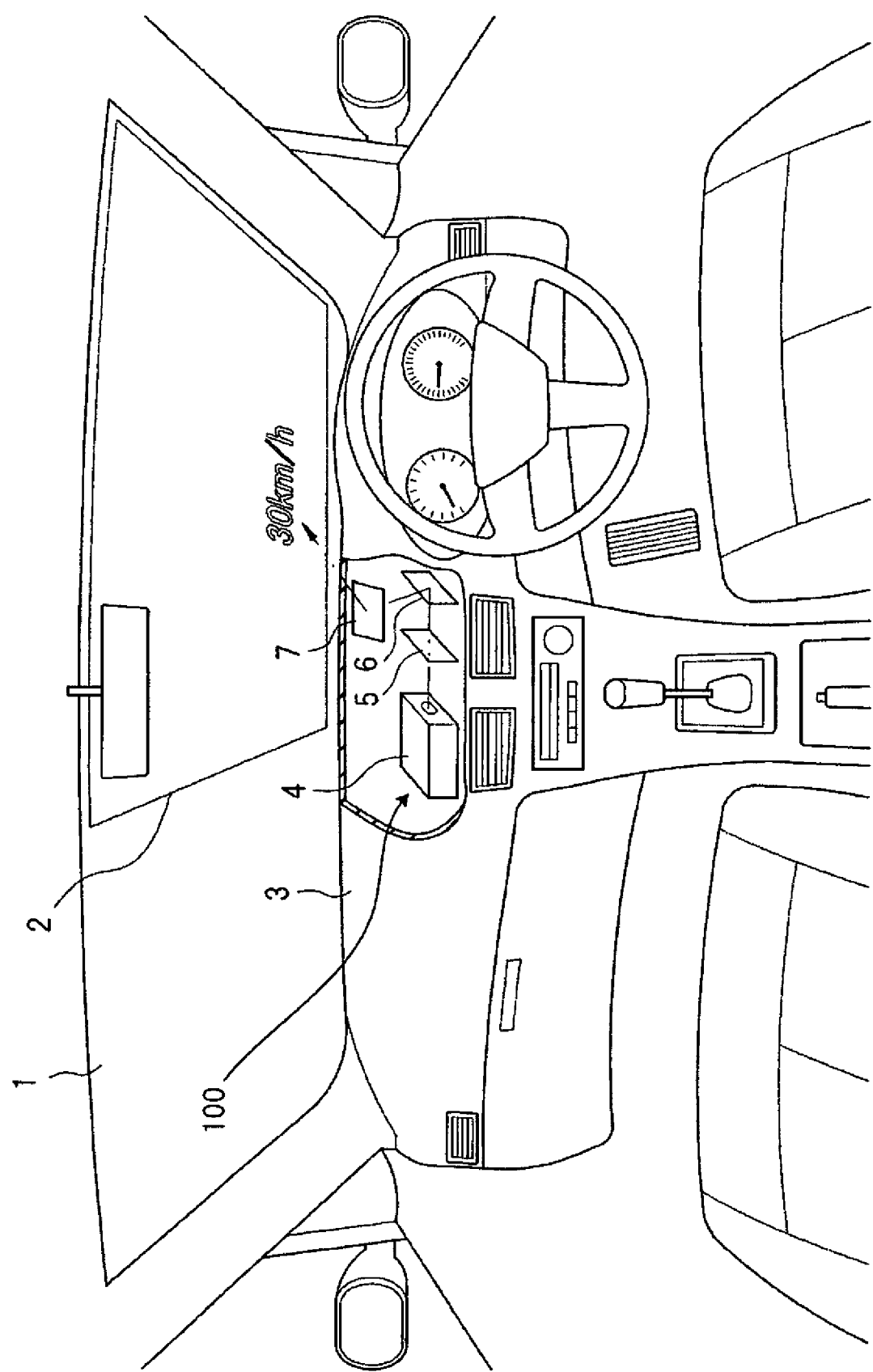
FIG. 2 is a schematic diagram illustrating an indoor configuration of the automobile 10 in which the HUD 100 illustrated in FIG. 1 is mounted.

FIG. 1 is a schematic diagram illustrating a schematic configuration of an automobile 10 in which a head-up display (HUD) 100, which is an embodiment of a projection display device of the present invention, is mounted. FIG. 2 is a schematic diagram illustrating an indoor configuration of the automobile 10 in which the HUD 100 illustrated in FIG. 1 is mounted.

As illustrated in FIG. 1, the automobile 10 includes an imaging unit 11 that is attached to a trunk portion located at a back portion of the automobile 10. A part of a front windshield 1 of the automobile 10 is a region that has been processed to reflect image light, which will be described below, and this region constitutes a projection surface 2.

The imaging unit 11 is for capturing an image of a region behind the automobile 10 and is connected to the HUD 100 in a wired or wireless manner. Captured image data obtained through image capturing performed by the imaging unit 11 is transferred to the HUD 100 through wired communication or wireless communication. The specific position of the imaging unit 11 is not limited as long as the imaging unit 11 is able to capture an image of a region behind the automobile 10, and may be, for example, a position near a license plate of the automobile 10 or a position near a rear window of the automobile 10.

FIG. 1 illustrates only the imaging unit 11 installed at the back portion of the automobile 10, but a plurality of imaging units each being able to capture an image of an outside view around the automobile 10 (for example, in front of the automobile 10 on the right or left) may be mounted in the automobile 10.

The HUD 100 is mounted in the automobile 10 and enables a driver of the automobile 10 to visually recognize a virtual image or real image by using image light projected onto the projection surface 2, which is a region of a part of the front windshield 1 of the automobile 10.

The HUD 100 may be used by being mounted in a vehicle, such as a train, a heavy machine, a construction machine, an aircraft, a ship, or an agricultural machine, as well as an automobile.

In the example illustrated in FIG. 2, the HUD 100 is built in a dashboard 3 of the automobile 10. The dashboard 3 is a member that contains, in its inside, built-in components including gauges for presenting information necessary for driving, such as a speedometer, a tachometer, a fuel gauge, a water temperature gauge, an odometer, or the like of the automobile 10.

The HUD 100 includes a control unit 4, a diffusion member 5, a reflection mirror 6, and a concave mirror 7. The control unit 4 includes a light source and a light modulation element that spatially modulates, in accordance with image data, light emitted by the light source. The diffusion member 5, the reflection mirror 6, and the concave mirror 7 constitute a projection unit that projects, onto the projection surface 2 on the front windshield 1, image light obtained through the spatial modulation performed by the light modulation element of the control unit 4.

The diffusion member 5 is a member that diffuses the image light obtained through the spatial modulation performed by the light modulation element of the control unit 4, thereby making a plane light source. As the diffusion member 5, a micromirror array having a fine structure on its surface, a diffusion mirror, a reflection holographic diffuser, or the like is used.

The reflection mirror 6 reflects the image light diffused by the diffusion member 5.

The concave mirror 7 enlarges and reflects the image light reflected by the reflection mirror 6 and projects the image light onto the projection surface 2. The projection surface 2 on the front windshield 1 has been processed to reflect the image light projected from the concave mirror 7 in the direction of the eyes of the driver.

Alternatively, the HUD 100 may be disposed near the ceiling of the automobile 10 and may have a configuration of projecting image light onto a combiner of a sun visor type installed near the ceiling of the automobile 10. In this configuration, the combiner constitutes a projection surface.

The driver of the automobile 10 is able to visually recognize information, such as an icon or characters, for assisting driving, by looking at a virtual image that is based on the image light projected onto and reflected by the projection surface 2. In addition, the projection surface 2 has a function of allowing light from the outside of the front windshield 1 (outside of the automobile) to pass therethrough. Thus, the driver is able to visually recognize an image in which a virtual image that is based on image light projected from the concave mirror 7 and an outside view are superimposed on one another.

Figure 3:
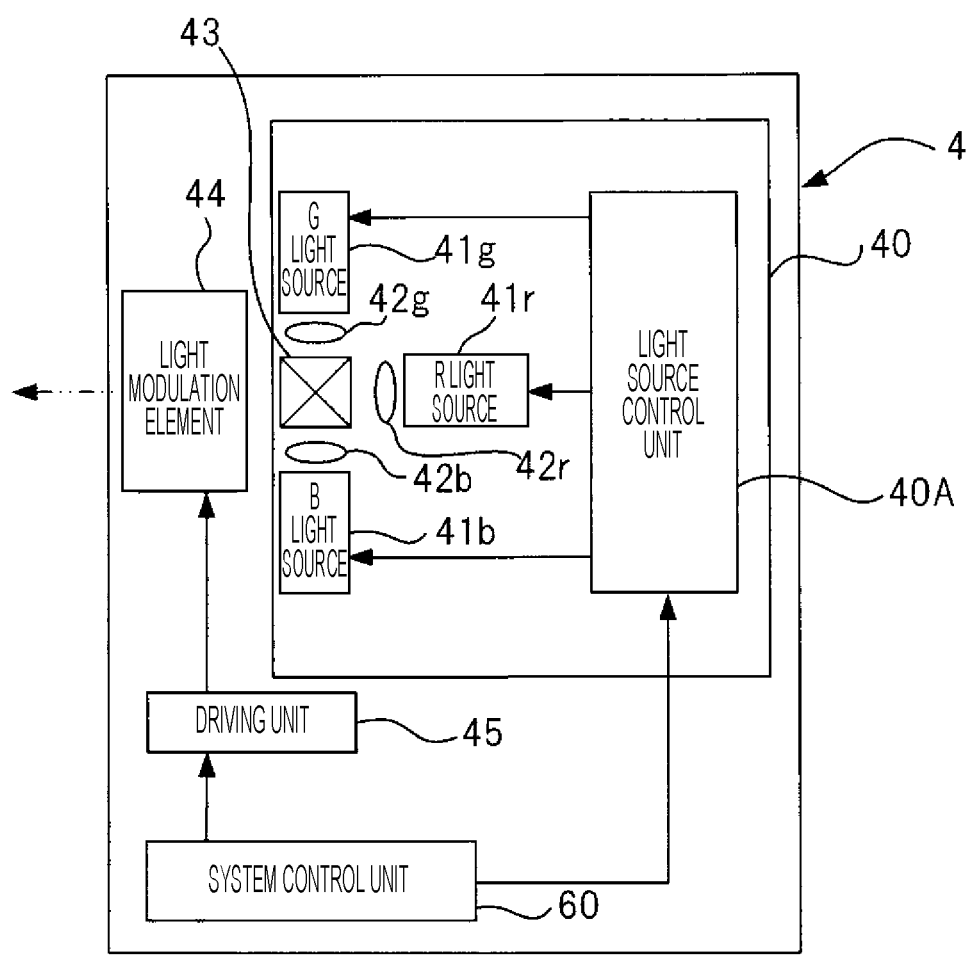
FIG. 3 is a schematic diagram illustrating a detailed configuration of a control unit 4 of the HUD 100 illustrated in FIG. 2.

FIG. 3 is a schematic diagram illustrating a detailed configuration of the control unit 4 of the HUD 100 illustrated in FIG. 2.

The control unit 4 includes a light source unit 40, a light modulation element 44, a driving unit 45 that drives the light modulation element 44, and a system control unit 60 that integrally controls the entire HUD 100.

The system control unit 60 is mainly constituted by one or a plurality of processors (central processing units (CPUs)), includes a read only memory (ROM) serving as a non-transitory recording medium storing a program or the like to be executed by the processor or processors, a random access memory (RAM) serving as a work memory, and so forth, and operates when the program stored in the recording medium is loaded thereto.

The light source unit 40 includes a light source control unit 40A, an R light source 41r serving as a red light source that emits red light, a G light source 41g serving as a green light source that emits green light, a B light source 41b serving as a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43. The R light source 41r, the G light source 41g, and the B light source 41b constitute a light source of the HUD 100.

The dichroic prism 43 is an optical member for guiding rays of light emitted by the R light source 41r, the G light source 41g, and the B light source 41b to an identical light path. The dichroic prism 43 allows red light collimated by the collimator lens 42r to pass therethrough and emits the red light to the light modulation element 44. In addition, the dichroic prism 43 allows green light collimated by the collimator lens 42g to be reflected thereby and emits the green light to the light modulation element 44. Furthermore, the dichroic prism 43 allows blue light collimated by the collimator lens 42b to be reflected thereby and emits the blue light to the light modulation element 44. The optical member having a function of guiding rays of light to an identical light path is not limited to the dichroic prism. For example, a cross dichroic mirror may be used.

A light emitting element, such as a laser or a light emitting diode (LED), is used as each of the R light source 41r, the G light source 41g, and the B light source 41b. The light source of the HUD 100 is not limited to the three light sources, that is, the R light source 41r, the G light source 41g, and the B light source 41b, and may be constituted by one light source, two light sources, or four or more light sources.

The light source control unit 40A controls each of the R light source 41r, the G light source 41g, and the B light source 41b, and performs control to cause light to be emitted by each of the R light source 41r, the G light source 41g, and the B light source 41b.

The light modulation element 44 spatially modulates, in accordance with image data received from the system control unit 60, the rays of light emitted by the R light source 41r, the G light source 41g, and the B light source 41b and emitted from the dichroic prism 43.

As the light modulation element 44, for example, liquid crystal on silicon (LCOS), a digital micromirror device (DMD), a micro electro mechanical systems (MEMS) element, a liquid crystal display element, or the like may be used.

The driving unit 45 drives the light modulation element 44 in accordance with image data received from the system control unit 60 and causes image light corresponding to the image data (red image light, blue image light, and green image light) to be emitted from the light modulation element 44 to the diffusion member 5.

The projection unit constituted by the diffusion member 5, the reflection mirror 6, and the concave mirror 7 illustrated in FIG. 2 is optically designed so that an image based on image light projected onto the projection surface 2 can be visually recognized by the driver as a virtual image at a position in front of the front windshield 1. The projection unit may be optically designed so that the image based on the image light can be visually recognized by the driver as a real image on the front windshield 1.

The system control unit 60 controls the light source control unit 40A and the driving unit 45 and causes image light that is based on image data to be emitted from the control unit 4 to the diffusion member 5.

The light source unit 40, the light modulation element 44, the driving unit 45, the diffusion member 5, the reflection mirror 6, and the concave mirror 7 constitute a projection display unit that performs, in accordance with image data received from the system control unit 60, spatial modulation on rays of light emitted by the R light source 41r, the G light source 41g, and the B light source 41b, and projects image light obtained through the spatial modulation onto the projection surface 2 in the automobile 10.

Figure 4:
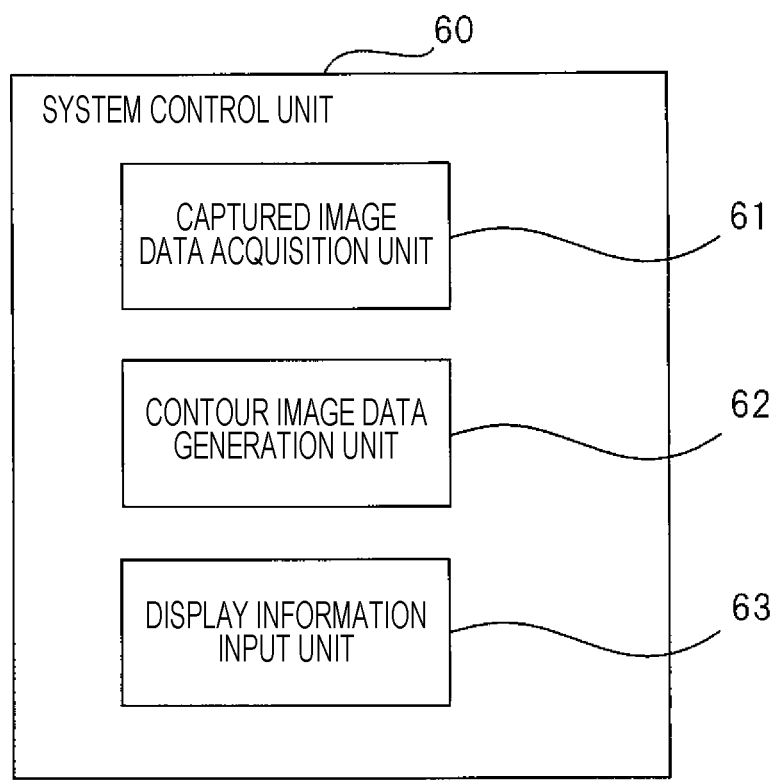
FIG. 4 is a functional block diagram of a system control unit 60 illustrated in FIG. 3.

FIG. 4 is a functional block diagram of the system control unit 60 illustrated in FIG. 3.

The system control unit 60 includes a captured image data acquisition unit 61, a contour image data generation unit 62, and a display information input unit 63. The captured image data acquisition unit 61, the contour image data generation unit 62, and the display information input unit 63 are implemented when a program stored in the ROM is executed by the one or plurality of processors. The program includes a projection display program.

The captured image data acquisition unit 61 acquires, through wired or wireless communication, captured image data obtained by capturing an image of a region behind the automobile 10 by the imaging unit 11.

The contour image data generation unit 62 generates, in accordance with the captured image data acquired by the captured image data acquisition unit 61, contour image data representing contours in a captured image that is based on the captured image data. Specifically, the contour image data generation unit 62 generates contour image data by performing a contour extraction process or a feature point extraction process on the captured image data.

The contour image data is, for example, image data in which a contour portion extracted from the captured image through the contour extraction process is colored in a color other than black (for example, white) and the other portion is colored in black, and is image data in which a contour portion extracted through the contour extraction process is represented by not a solid line but a broken line, a chain line, or the like having a color other than black (for example, white) and the other portion is colored in black, or is image data in which feature points obtained through feature point extraction are colored in a color other than black (for example, white) and the other portion is colored in black.

The display information input unit 63 inputs, to the driving unit 45, either first image data including information such as navigation information, a fuel level, or a travel speed, or second image data including at least the contour image data generated by the contour image data generation unit 62, and causes image light that is based on the input image data to be projected onto the projection surface 2. The display information input unit 63 determines, in accordance with the drive mode of the automobile 10, which of the first image data and the second image data is to be input to the driving unit 45.

The second image data may include, in addition to the contour image data, information for assisting driving when reversing the automobile 10, such as information for giving a warning about the presence of an obstacle by using characters, an icon, or the like.

The drive mode includes at least two modes: a forward mode in which the automobile 10 moves toward a region in front of the front windshield 1 (in a direction of the hood) viewed from the driver; and a reverse mode in which the automobile 10 moves in a direction away from the region in front of the front windshield 1. The drive mode can be set by the driver by operating a shift lever or the like of the automobile 10.

When the automobile 10 is set to the reverse mode, the display information input unit 63 inputs the second image data to the driving unit 45. When the automobile 10 is set to the forward mode, the display information input unit 63 inputs the first image data to the driving unit 45.

Figure 5:
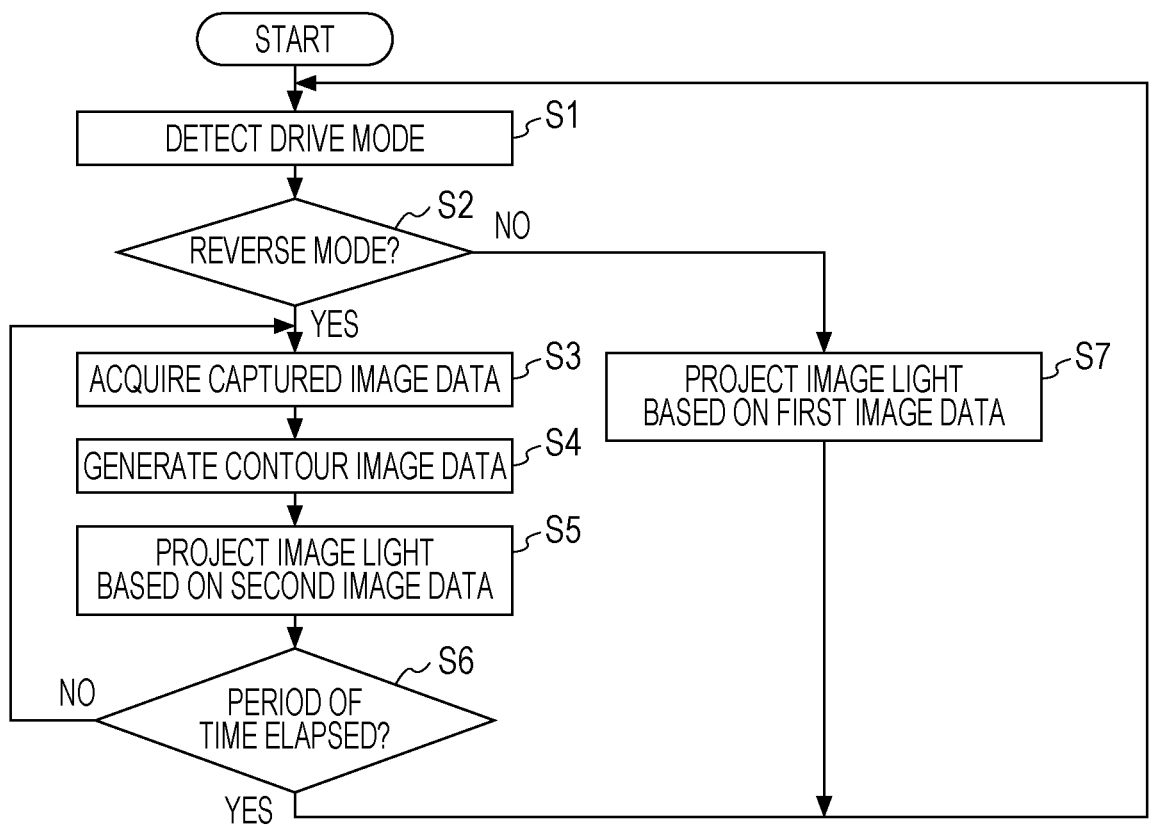
FIG. 5 is a flowchart for describing an operation of the HUD 100 illustrated in FIG. 2.

FIG. 5 is a flowchart for describing an operation of the HUD 100 illustrated in FIG. 2. In the description of FIG. 5, display examples of images observed by the driver will also be described with reference to FIGS. 6 and 7. The process illustrated in FIG. 5 is repeatedly executed while the power of the HUD 100 is in an ON state.

First, the display information input unit 63 detects the drive mode of the automobile 10 (step S1) and determines whether or not the drive mode has been set to the reverse mode (step S2). The display information input unit 63 determines that the drive mode has been set to the reverse mode if a state in which the shift lever is at the "reverse" position continues for a predetermined period of time (for example, 2 seconds). If the display information input unit 63 determines that the drive mode has been set to the reverse mode (YES in step S2), the captured image data acquisition unit 61 acquires captured image data captured by the imaging unit 11 (step S3).

Here, the reason it is determined that the drive mode has been set to the reverse mode if a state in which the shift lever is at the "reverse" position continues for a predetermined period of time is to prevent a situation from occurring where the process from step S3 is performed because, for example, the shift lever is instantaneously at the "reverse" position due to an operation of moving the shift lever from the "drive" position to the "parking" position. In an automobile in which the drive mode can be individually set by a button operation or the like, an affirmative determination may be made in step S2 when pressing of a button corresponding to the reverse mode is detected.

Subsequently, the contour image data generation unit 62 performs a contour extraction process on the captured image data acquired in step S3 and generates contour image data (step S4).

Subsequently, the display information input unit 63 inputs, to the driving unit 45, second image data including the contour image data generated by the contour image data generation unit 62. The driving unit 45 drives the light modulation element 44 in accordance with the second image data input by the display information input unit 63, thereby causing image light that is based on the second image data to be projected onto the projection surface 2 (step S5). Accordingly, a contour image 110 is observed by the driver, as illustrated in FIG. 6.

Figure 6:
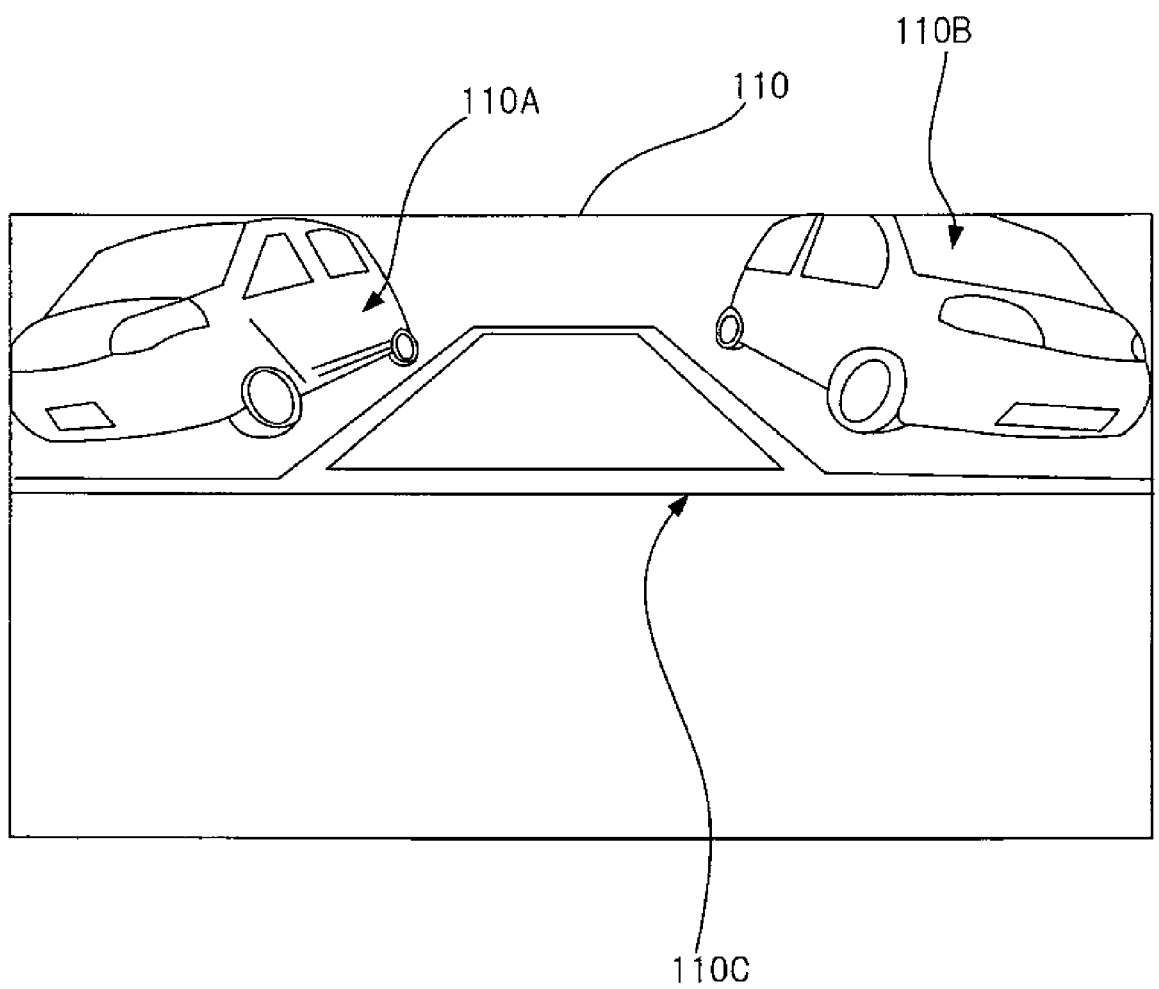
FIG. 6 is a diagram illustrating an example of a contour image displayed on the HUD 100.

As illustrated in FIG. 6, the contour image 110 includes a contour 110A and a contour 110B of automobiles parked in a parking lot and a contour 110C of a white line on the ground of the parking lot. When the light modulation element 44 is a liquid crystal display element, a portion other than the contours 110A to 110C in the contour image 110 is transparent because the portion corresponds to a portion where light is blocked in the light modulation element 44. When the light modulation element 44 is a DMD, the portion other than the contours 110A to 110C in the contour image 110 is visually recognized as being transparent because light is reflected in a direction in which the light is not projected onto the projection surface 2.

Figure 7:
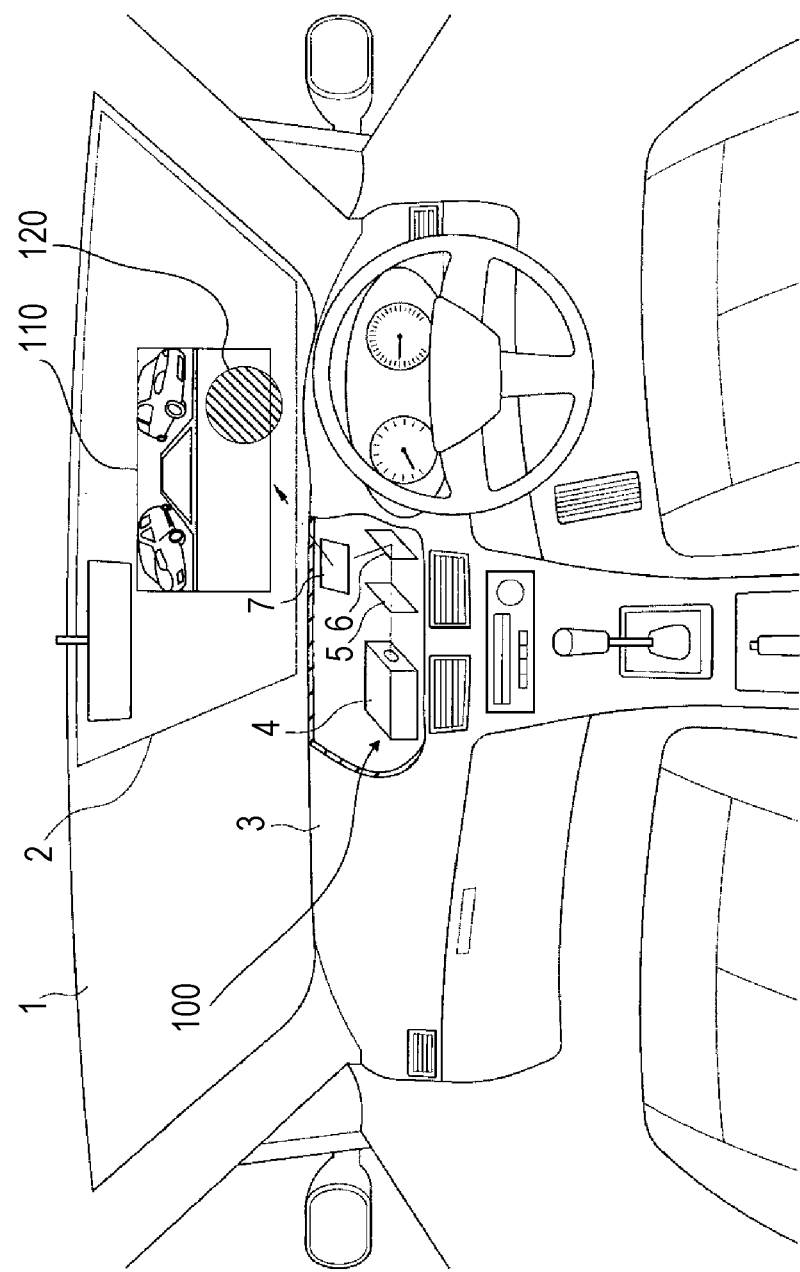
FIG. 7 is a schematic diagram illustrating an observation state of a contour image 110 illustrated in FIG. 6 inside the automobile 10.

FIG. 7 is a schematic diagram illustrating an observation state of the contour image 110 inside the automobile 10. The contour image 110, which has been obtained by capturing an image of a region behind the automobile 10, is observed as a virtual image in front of the projection surface 2. In the example illustrated in FIG. 7, an obstacle 120 is present in front of the projection surface 2 on the front windshield 1. The driver is able to visually recognize the obstacle 120 through the transparent portion (the portion other than the contours) in the contour image 110 while visually recognizing the contour image 110.

After step S5, the display information input unit 63 determines whether or not a predetermined period of time has elapsed from when it is determined that the automobile 10 has been set to the reverse mode (step S6). If the predetermined period of time has not elapsed (NO in step S6), the process returns to step S3. If the display information input unit 63 determines that the predetermined period of time has elapsed (YES in step S6), the process returns to step S1, and the above-described process is repeated.

If the display information input unit 63 determines in step S2 that the drive mode has been set to the forward mode (NO in step S2), the display information input unit 63 inputs first image data to the driving unit 45. The driving unit 45 drives the light modulation element 44 in accordance with the first image data input by the display information input unit 63, thereby causing image light that is based on the first image data to be projected onto the projection surface 2. Accordingly, information for assisting driving when the automobile 10 moves forward, such as navigation information, a fuel level, or a travel speed, is projected onto the projection surface 2. After step S7, the process returns to step S1, and the above-described process is repeated.

As described above, according to the HUD 100, when the automobile 10 is set to the reverse mode, image light that is based on contour image data generated from captured image data obtained through image capturing performed by the imaging unit 11 is projected onto the projection surface 2. A contour image based on the image light enables the driver to check a situation, such as an obstacle or the like in a moving direction (backward direction) of the automobile 10, while keeping a posture for looking toward the front windshield 1. Thus, the driver is able to safely and easily perform a parking operation or the like of the automobile 10.

As illustrated in FIG. 7, the contour image 110 is an image in which the portion other than contours is transparent. Thus, even in a state in which the contour image 110 is displayed, a field of vision in front of the front windshield 1 is not obstructed, and safety can be adequately ensured during a back-and-forth movement of the automobile 10.

In addition, according to the HUD 100, the contour image 110 is continuously displayed until the predetermined period of time elapses from when it is determined that the drive mode has been set to the reverse mode. Thus, even in a situation where switching between the forward mode and the reverse mode frequently occurs as in a parking operation or the like, frequent switching between display and non-display of the contour image 110 can be prevented, and a smooth parking operation can be assisted.

Note that the contour image data may be data in which contours in a captured image extracted through a contour extraction process are represented in a plurality of display styles, not in a single display style.

For example, in the example in FIG. 6, the contour image data may be image data in which contours in a captured image are represented in a plurality of colors, for example, the contour 110C of the white line may be white and the contours 110A and 110B of the automobiles may be red or another color. With this configuration, a plurality of objects, such as a white line and an obstacle, can be easily distinguished from each other and the visibility can be increased.

Figure 8:
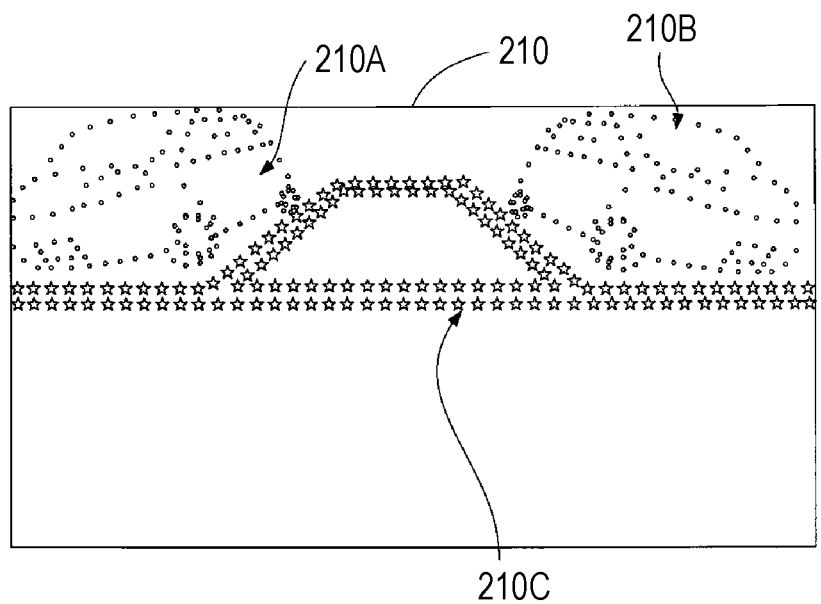
FIG. 8 is a diagram illustrating another example of a contour image displayed on the HUD 100.

Alternatively, as illustrated in FIG. 8, the contour image data may be image data in which contours in a captured image are represented by a plurality of symbols, for example, the contour of the white line may be represented by a group 210C of stars and the contours of the automobiles may be represented by groups 210A and 210B of circles. With this configuration, a plurality of objects, such as a white line and an obstacle, can be easily distinguished from each other and the visibility can be increased.

Figure 9:
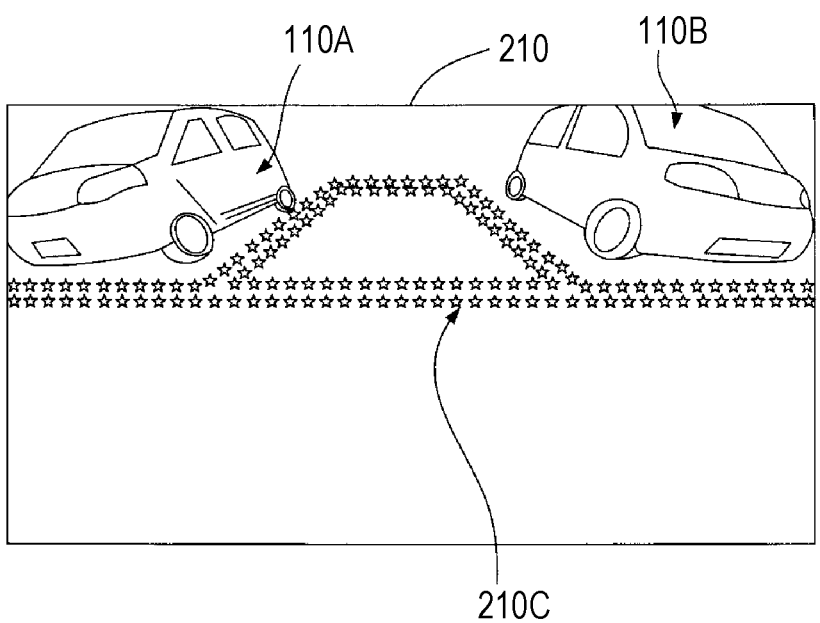
FIG. 9 is a diagram illustrating still another example of a contour image displayed on the HUD 100.

Alternatively, as illustrated in FIG. 9, the contour image data may be image data in which the contour of the white line including many straight line portions is represented by the group 210C of symbols and the contours 110A and 110B of objects including many curved lines, such as automobiles, are represented by lines. With this configuration, the visibility of a region behind the automobile 10 can be increased.

Preferably, each symbol representing a contour in the contour image data is data that is blacked out. Accordingly, when the symbol is displayed as a virtual image, a situation can be prevented from occurring where a field of front vision is obstructed by the symbol.

Figure 10:
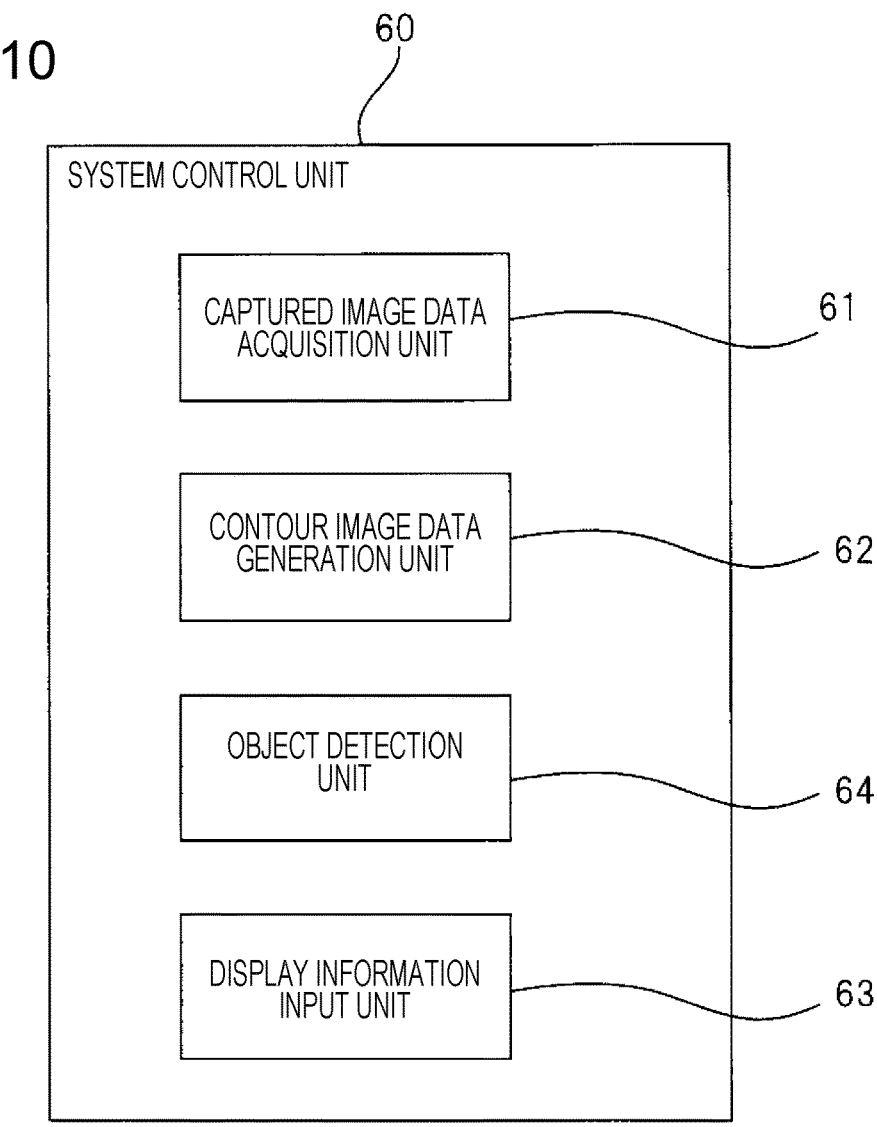
FIG. 10 is a diagram illustrating a modification example of functional blocks of the system control unit 60 of the HUD 100 illustrated in FIG. 4.

FIG. 10 is a diagram illustrating a modification example of the functional blocks of the system control unit 60 of the HUD 100 illustrated in FIG. 4. In FIG. 10, the elements identical to those in FIG. 4 are denoted by identical reference numerals and the description thereof will not be given.

The system control unit 60 illustrated in FIG. 10 has a configuration identical to that in FIG. 4 except that an object detection unit 64 is added.

The object detection unit 64 detects, through image processing, an object from captured image data acquired by the captured image data acquisition unit 61. The object is, for example, a three-dimensional object that may become an obstacle to a driving automobile, such as a person, a wall, a utility pole, or an automobile.

If the area of an object detected by the object detection unit 64 is smaller than or equal to a threshold value, the display information input unit 63 of the system control unit 60 illustrated in FIG. 10 generates replaced contour image data in which a portion corresponding to the object in the contour image data generated by the contour image data generation unit 62 has been replaced with a portion corresponding to the object in the captured image data acquired by the captured image data acquisition unit 61, and inputs the replaced contour image data to the driving unit 45.

If the area of the object detected by the object detection unit 64 exceeds the threshold value, the display information input unit 63 inputs the contour image data generated by the contour image data generation unit 62 to the driving unit 45.

For example, a description will be given of a case where the captured image data captured by the imaging unit 11 is the data illustrated in FIG. 11. The captured image data illustrated in FIG. 11 includes a white line 301 representing a parking space and an object 300, such as another automobile.

Figure 11:
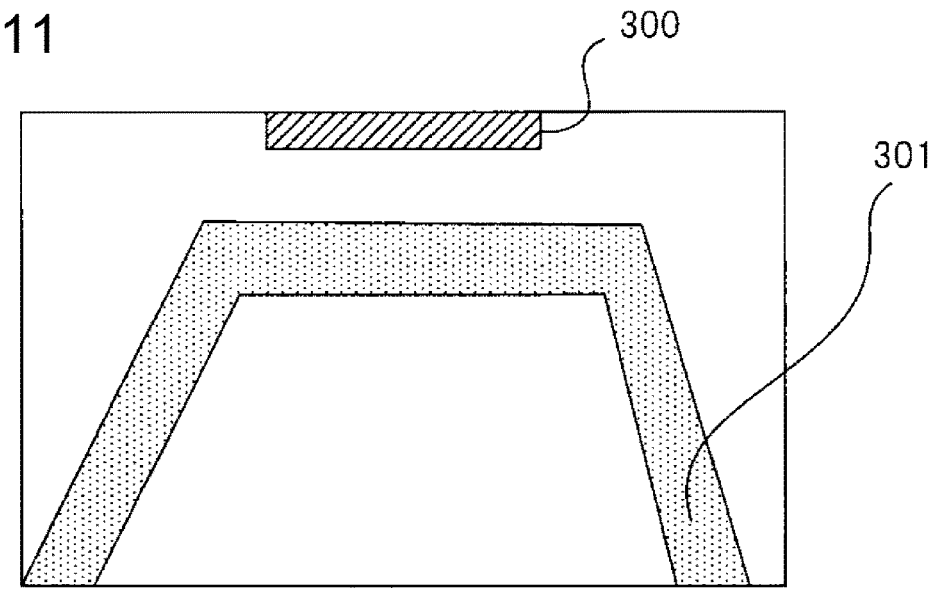
FIG. 11 is a diagram illustrating an example of captured image data captured by an imaging unit 11 of the automobile 10 illustrated in FIG. 1.

The area of the object 300 detected by the object detection unit 64 from the captured image data illustrated in FIG. 11 is smaller than or equal to the threshold value. Thus, the display information input unit 63 generates replaced contour image data in which a portion encompassed with the contour of the object 300 in the contour image data generated from the captured image data (image data representing the contour of the white line 301 and the contour of the object 300) is replaced with the image of the object 300 illustrated in FIG. 11, and inputs the replaced contour image data to the driving unit 45.

Figure 12:
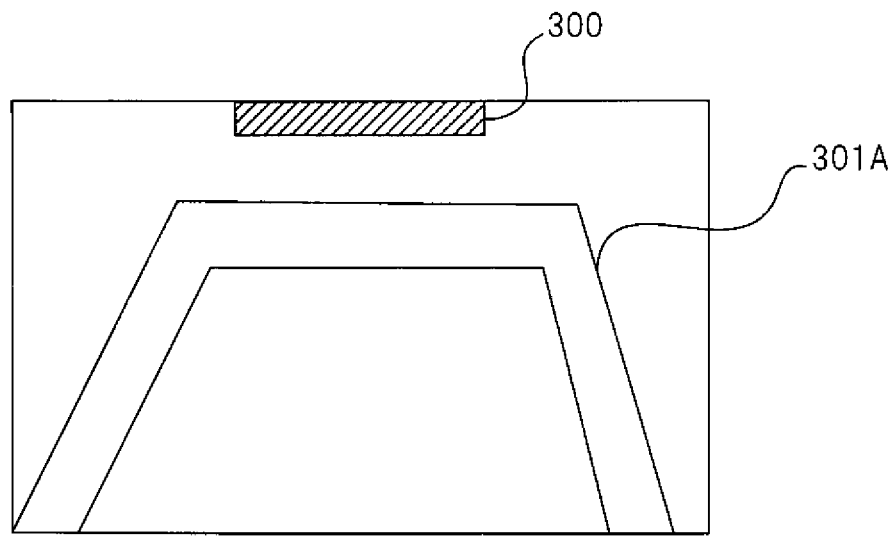
FIG. 12 is a diagram illustrating replaced contour image data generated from the captured image data illustrated in FIG. 11.

FIG. 12 is a diagram illustrating the replaced contour image data generated from the captured image data illustrated in FIG. 11. The replaced contour image data illustrated in FIG. 12 includes a contour 301A of the white line 301 illustrated in FIG. 11 and the object 300 illustrated in FIG. 11.

Figure 13:
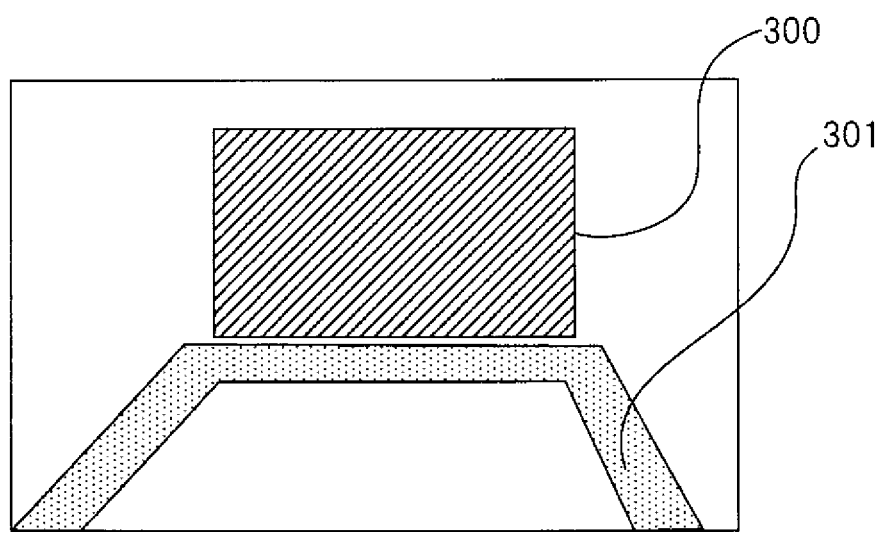
FIG. 13 is a diagram illustrating captured image data captured by the imaging unit 11 in a state in which the automobile 10 has further reversed from a state in which the captured image data illustrated in FIG. 11 is acquired.

FIG. 13 is a diagram illustrating captured image data captured by the imaging unit 11 in a state in which the automobile 10 has further reversed from the state in which the captured image data illustrated in FIG. 11 is acquired.

The captured image data illustrated in FIG. 13 includes, as in FIG. 11, the white line 301 representing the parking space and the object 300, such as another automobile. In the captured image data illustrated in FIG. 13, unlike in FIG. 11, the area of the object 300 is large, and the area of the object 300 detected by the object detection unit 64 from the captured image data illustrated in FIG. 13 exceeds the threshold value.

In this case, the display information input unit 63 inputs, to the driving unit 45, contour image data (image data representing the contour of the white line 301 and the contour of the object 300) generated from the captured image data.

Figure 14:
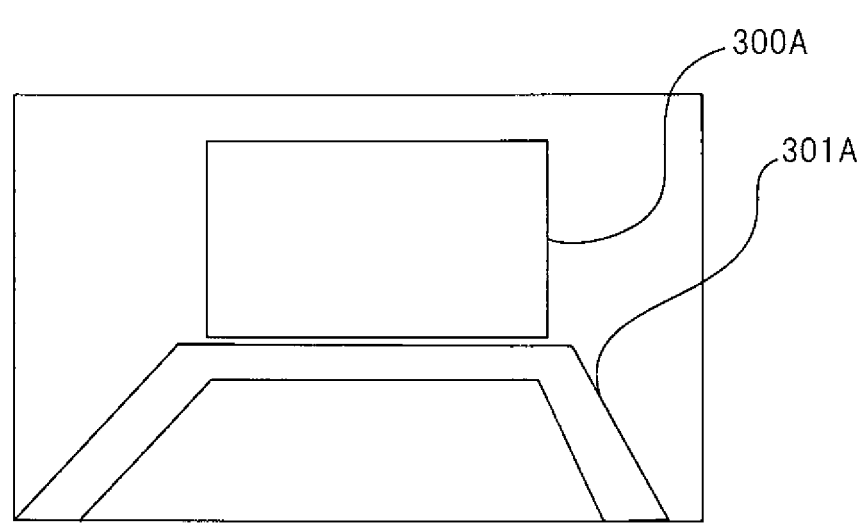
FIG. 14 is a diagram illustrating contour image data generated from the captured image data illustrated in FIG. 13.

FIG. 14 is a diagram illustrating the contour image data generated from the captured image data illustrated in FIG. 13. The contour image data illustrated in FIG. 14 includes the contour 301A of the white line 301 illustrated in FIG. 13 and a contour 300A of the object 300 illustrated in FIG. 13.

As described above, in a state in which the area of an object is smaller than or equal to the threshold value, that is, in a state in which an object as an obstacle is at a distant place, the system control unit 60 of the modification example displays the image of the object, not the contour of the object. In a state in which the area of an object is small, even if the image of the object is displayed, only a small area of the field of vision in front of the front windshield 1 is obstructed and thus a sufficient field of front vision can be ensured. In addition, in a state in which the area of an object is small, the visibility of the object can be increased by displaying the object as an image, not as a contour. Accordingly, the driver is able to notice the presence of the object in an early stage and to prepare for a necessary action.

On the other hand, in a state in which the area of an object exceeds the threshold value, the object is displayed as a contour, not as an image. Thus, a sufficient field of vision in front of the automobile 10 can be ensured while the driver is allowed to recognize the object.

In the configuration described above, contour image data is generated from captured image data captured by the imaging unit 11 that is attached to the back portion of the automobile 10. In addition, another imaging unit may be attached to each of side mirrors on the right and left of the automobile 10, and an image of a region behind the automobile 10 may be captured from each of a right side of the automobile 10 and a left side of the automobile 10. In this configuration, the system control unit 60 generates contour image data from pieces of captured imaged data captured by the imaging units on the right and left and causes image light that is based on the generated contour image data to be projected onto the projection surface 2. Accordingly, the driver is able to recognize situations on the right and left during driving while looking ahead without moving his/her line of sight. This configuration is effective at the time of changing lane.

As described above, this specification discloses the followings.

A projection display device that is disclosed includes a captured image data acquisition unit that acquires captured image data obtained through image capturing performed by an imaging unit that captures an image of a region around a vehicle; a contour image data generation unit that generates, in accordance with the captured image data, contour image data representing contours in a captured image that is based on the captured image data; and a projection display unit that performs, in accordance with image data including the contour image data, spatial modulation on light emitted by a light source, and projects image light obtained through the spatial modulation onto a projection surface in the vehicle.

In the projection display device that is disclosed, a forward mode and a reverse mode are settable in the vehicle, the forward mode being a mode in which the vehicle moves toward a region in front of a front windshield of the vehicle viewed from a driver, the reverse mode being a mode in which the vehicle moves toward a region behind the vehicle in a direction away from the region in front of the front windshield, the imaging unit captures an image of the region behind the vehicle, and the projection display unit starts, in synchronization with a timing at which the vehicle is set to the reverse mode, projecting the image light that is based on the image data including the contour image data.

In the projection display device that is disclosed, the projection display unit projects the image light that is based on the image data including the contour image data in a predetermined period of time from when the vehicle is set to the reverse mode.

In the projection display device that is disclosed, the contour image data includes data in which the contours in the captured image are represented in a plurality of display styles.

In the projection display device that is disclosed, the contour image data includes data in which the contours in the captured image are represented in a plurality of colors.

In the projection display device that is disclosed, the contour image data includes data in which the contours in the captured image are represented by a plurality of symbols.

The projection display device that is disclosed further includes an object detection unit that detects an object from the captured image data. In the case where an area of the object detected by the object detection unit is smaller than or equal to a threshold value, the projection display unit projects the image light in accordance with replaced contour image data in which a portion corresponding to the object in the contour image data has been replaced with a portion corresponding to the object in the captured image data, and in the case where the area of the object detected by the object detection unit exceeds the threshold value, the projection display unit projects the image light in accordance with the contour image data.

A projection display method that is disclosed includes a captured image data acquisition step of acquiring captured image data obtained through image capturing performed by an imaging unit that captures an image of a region around a vehicle; a contour image data generation step of generating, in accordance with the captured image data, contour image data representing contours in a captured image that is based on the captured image data; and a projection display step of performing, in accordance with data including the contour image data, spatial modulation on light emitted by a light source, and projecting image light obtained through the spatial modulation onto a projection surface in the vehicle.

In the projection display method that is disclosed, a forward mode and a reverse mode are settable in the vehicle, the forward mode being a mode in which the vehicle moves toward a region in front of a front windshield of the vehicle viewed from a driver, the reverse mode being a mode in which the vehicle moves toward a region behind the vehicle in a direction away from the region in front of the front windshield, the imaging unit captures an image of the region behind the vehicle, and in the projection display step, projection of the image light that is based on the contour image data is started in synchronization with a timing at which the vehicle is set to the reverse mode.

In the projection display method that is disclosed, in the projection display step, projection of the image light that is based on the contour image data is performed in a predetermined period of time from when the vehicle is set to the reverse mode.

In the projection display method that is disclosed, the contour image data includes data in which the contours in the captured image are represented in a plurality of display styles.

In the projection display method that is disclosed, the contour image data includes data in which the contours in the captured image are represented in a plurality of colors.

In the projection display method that is disclosed, the contour image data includes data in which the contours in the captured image are represented by a plurality of symbols.

The projection display method that is disclosed further includes an object detection step of detecting an object from the captured image data. In the projection display step, in the case where an area of the object detected in the object detection step is smaller than or equal to a threshold value, projection of the image light is performed in accordance with replaced contour image data in which a portion corresponding to the object in the contour image data has been replaced with a portion corresponding to the object in the captured image data, and in the case where the area of the object detected in the object detection step exceeds the threshold value, projection of the image light is performed in accordance with the contour image data.

A non-transitory recording medium readable by a computer for recording a projection display program that is disclosed is a program for causing a computer to execute a captured image data acquisition step of acquiring captured image data obtained through image capturing performed by an imaging unit that captures an image of a region around a vehicle; a contour image data generation step of generating, in accordance with the captured image data, contour image data representing contours in a captured image that is based on the captured image data; and a projection display step of performing, in accordance with data including the contour image data, spatial modulation on light emitted by a light source, and projecting image light obtained through the spatial modulation onto a projection surface in the vehicle.

A projection display device that is disclosed includes a captured image data acquisition processor that acquires captured image data obtained through image capturing performed by an imaging unit that captures an image of a region around a vehicle; a contour image data generation processor that generates, in accordance with the captured image data, contour image data representing contours in a captured image that is based on the captured image data; and a projection display processor that performs, in accordance with image data including the contour image data, spatial modulation on light emitted by a light source, and projects image light obtained through the spatial modulation onto a projection surface in the vehicle, and an object detection processor that detects an object from the captured image data, in the case where an area of the object detected by the object detection processor is smaller than or equal to a threshold value, the projection display processor projects the image light in accordance with replaced contour image data in which a portion corresponding to the object in the contour image data has been replaced with a portion corresponding to the object in the captured image data, and in the case where the area of the object detected by the object detection processor exceeds the threshold value, the projection display processor projects the image light in accordance with the contour image data.

The present invention is particularly convenient and effective for installation on a vehicle in which it is difficult to directly look behind at the time of reversing, such as a bus, a truck, a construction machine, a heavy machine, or a dump truck.

REFERENCE SIGNS LIST

100 HUD
1 front windshield
2 projection surface
3 dashboard
4 control unit
5 diffusion member
6 reflection mirror
7 concave mirror
10 automobile
11 imaging unit
40 light source unit
40A light source control unit
41r R light source
41g G light source
41b B light source
42r, 42g, 42b collimator lens
43 dichroic prism
44 light modulation element
45 driving unit
60 system control unit
61 captured image data acquisition unit
62 contour image data generation unit
63 display information input unit
64 object detection unit
110, 210 contour image
110A, 110B contour of automobile
110C contour of white line
120 obstacle
210A, 210B group of circles representing contour of automobile
210C group of stars representing white line
300 object
301 white line
300A contour of object
301A contour of white line

What is claimed is:

1. A projection display device comprising:
a captured image data acquisition unit that acquires captured image data obtained through image capturing performed by an imaging unit that captures an image of a region around a vehicle;
a contour image data generation unit that generates, in accordance with the captured image data, contour image data representing contours in a captured image that is based on the captured image data;
a projection display unit that performs, in accordance with image data including the contour image data, spatial modulation on light emitted by a light source, and projects image light obtained through the spatial modulation onto a projection surface in the vehicle; and
an object detection unit that detects an object from the captured image data, wherein
in the case where an area of the object detected by the object detection unit is smaller than or equal to a threshold value, the projection display unit projects the image light in accordance with replaced contour image data in which a portion corresponding to the object in the contour image data has been replaced with a portion corresponding to the object in the captured image data, and in the case where the area of the object detected by the object detection unit exceeds the threshold value, the projection display unit projects the image light in accordance with the contour image data.

2. The projection display device according to claim 1, wherein
a forward mode and a reverse mode are settable in the vehicle, the forward mode being a mode in which the vehicle moves toward a region in front of a front windshield of the vehicle viewed from a driver, the reverse mode being a mode in which the vehicle moves toward a region behind the vehicle in a direction away from the region in front of the front windshield,
the imaging unit captures an image of the region behind the vehicle, and
the projection display unit starts, in synchronization with a timing at which the vehicle is set to the reverse mode, projecting the image light that is based on the image data including the contour image data.

3. The projection display device according to claim 2, wherein
the projection display unit projects the image light that is based on the image data including the contour image data in a predetermined period of time from when the vehicle is set to the reverse mode.

4. The projection display device according to claim 1, wherein
the contour image data is data in which the contours in the captured image are represented in a plurality of display styles.

5. The projection display device according to claim 2, wherein
the contour image data is data in which the contours in the captured image are represented in a plurality of display styles.

6. The projection display device according to claim 3, wherein
the contour image data is data in which the contours in the captured image are represented in a plurality of display styles.

7. The projection display device according to claim 4, wherein
the contour image data is data in which the contours in the captured image are represented in a plurality of colors.

8. The projection display device according to claim 5, wherein
the contour image data is data in which the contours in the captured image are represented in a plurality of colors.

9. The projection display device according to claim 6, wherein
the contour image data is data in which the contours in the captured image are represented in a plurality of colors.

10. The projection display device according to claim 4, wherein
the contour image data is data in which the contours in the captured image are represented by a plurality of symbols.

11. The projection display device according to claim 5, wherein
the contour image data is data in which the contours in the captured image are represented by a plurality of symbols.

12. The projection display device according to claim 6, wherein
the contour image data is data in which the contours in the captured image are represented by a plurality of symbols.

13. A projection display method of the projection display device according to claim 1 comprising:
a captured image data acquisition step of acquiring captured image data obtained through image capturing performed by an imaging unit that captures an image of a region around a vehicle;
a contour image data generation step of generating, in accordance with the captured image data, contour image data representing contours in a captured image that is based on the captured image data; and
a projection display step of performing, in accordance with data including the contour image data, spatial modulation on light emitted by a light source, and projecting image light obtained through the spatial modulation onto a projection surface in the vehicle; and
an object detection step of detecting an object from the captured image data, wherein
in the projection display step, in the case where an area of the object detected in the object detection step is smaller than or equal to a threshold value, projection of the image light is performed in accordance with replaced contour image data in which a portion corresponding to the object in the contour image data has been replaced with a portion corresponding to the object in the captured image data, and in the case where the area of the object detected in the object detection step exceeds the threshold value, projection of the image light is performed in accordance with the contour image data.

14. The projection display method according to claim 13, wherein
a forward mode and a reverse mode are settable in the vehicle, the forward mode being a mode in which the vehicle moves toward a region in front of a front windshield of the vehicle viewed from a driver, the reverse mode being a mode in which the vehicle moves toward a region behind the vehicle in a direction away from the region in front of the front windshield,
the imaging unit captures an image of the region behind the vehicle, and
in the projection display step, projection of the image light that is based on the contour image data is started in synchronization with a timing at which the vehicle is set to the reverse mode.

15. The projection display method according to claim 12, wherein
in the projection display step, projection of the image light that is based on the contour image data is performed in a predetermined period of time from when the vehicle is set to the reverse mode.

16. The projection display method according to claim 13, wherein
the contour image data is data in which the contours in the captured image are represented in a plurality of display styles.

17. The projection display method according to claim 16, wherein
the contour image data is data in which the contours in the captured image are represented in a plurality of colors.

18. The projection display method according to claim 16, wherein
the contour image data is data in which the contours in the captured image are represented by a plurality of symbols.

19. A non-transitory recording medium readable by a computer for recording a projection display program for causing a computer to execute a projection display method of the projection display device according to claim 1:
a captured image data acquisition step of acquiring captured image data obtained through image capturing performed by an imaging unit that captures an image of a region around a vehicle;
a contour image data generation step of generating, in accordance with the captured image data, contour image data representing contours in a captured image that is based on the captured image data; and
a projection display step of performing, in accordance with data including the contour image data, spatial modulation on light emitted by a light source, and projecting image light obtained through the spatial modulation onto a projection surface in the vehicle; and
an object detection step of detecting an object from the captured image data, wherein
in the projection display step, in the case where an area of the object detected in the object detection step is smaller than or equal to a threshold value, projection of the image light is performed in accordance with replaced contour image data in which a portion corresponding to the object in the contour image data has been replaced with a portion corresponding to the object in the captured image data, and in the case where the area of the object detected in the object detection step exceeds the threshold value, projection of the image light is performed in accordance with the contour image data.

20. A projection display device comprising:
a captured image data acquisition processor that acquires captured image data obtained through image capturing performed by an imaging unit that captures an image of a region around a vehicle;
a contour image data generation processor that generates, in accordance with the captured image data, contour image data representing contours in a captured image that is based on the captured image data;
a projection display processor that performs, in accordance with image data including the contour image data, spatial modulation on light emitted by a light source, and projects image light obtained through the spatial modulation onto a projection surface in the vehicle; and
an object detection processor that detects an object from the captured image data, wherein
in the case where an area of the object detected by the object detection processor is smaller than or equal to a threshold value, the projection display processor projects the image light in accordance with replaced contour image data in which a portion corresponding to the object in the contour image data has been replaced with a portion corresponding to the object in the captured image data, and in the case where the area of the object detected by the object detection processor exceeds the threshold value, the projection display processor projects the image light in accordance with the contour image data.

* * * * *